Feb. 6, 1973  R. A. SCHAFER  3,715,133
ATTACHMENTS PERMITTING A VEHICLE TONGUE TO BE LIFTED BY
ACTUATION OF TRACTOR DRAFT LINKS
Filed May 10, 1971  2 Sheets-Sheet 1
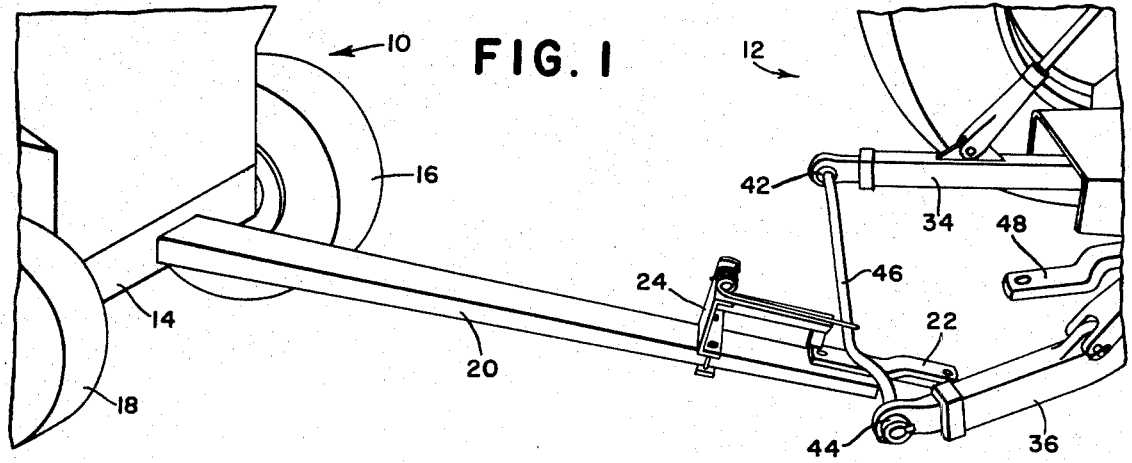
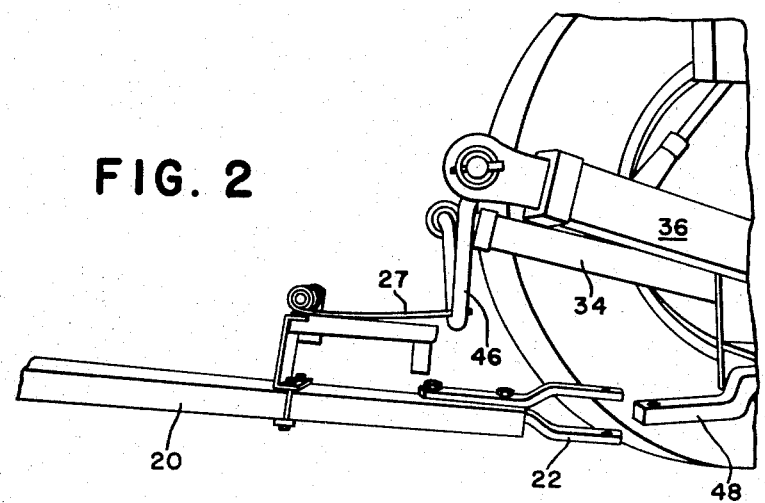
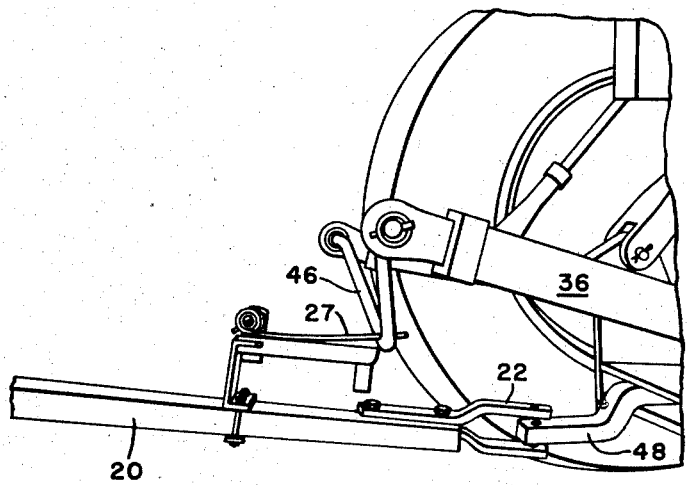
*INVENTOR.*
R. A. SCHAFER

FIG. 4
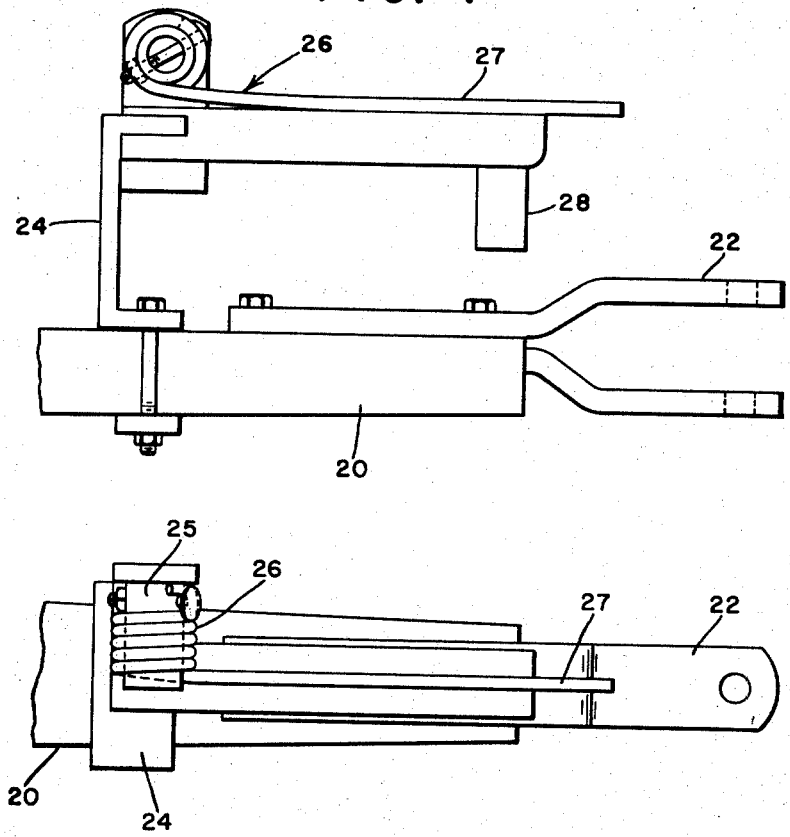
FIG. 5
FIG. 6
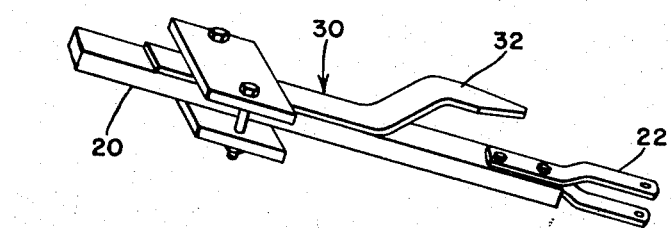
*INVENTOR.*
R. A. SCHAFER

United States Patent Office 3,715,133
Patented Feb. 6, 1973

3,715,133
ATTACHMENTS PERMITTING A VEHICLE
TONGUE TO BE LIFTED BY ACTUATION
OF TRACTOR DRAFT LINKS
Richard Arthur Schafer, Hudson, Iowa, assignor to
Deere & Company, Moline, Ill.
Filed May 10, 1971, Ser. No. 141,904
Int. Cl. B60d 1/04
U.S. Cl. 280—479 A                                   6 Claims

ABSTRACT OF THE DISCLOSURE

A two-wheeled vehicle and an agricultural tractor have cooperative attachments for permitting the tractor draft links to be operated to raise the tongue of the vehicle from the ground into position for connection to the tractor drawbar. Specifically, a spring member is fixed to the vehicle tongue, rearwardly of the forward end of the latter, and includes a free end portion extending forwardly above the tongue. A V-shaped pickup rod has its opposite ends received in ball connectors at the rear ends of the lift arms of the tractor and is adapted to liftingly engage the free end portion of the spring member.

BACKGROUND OF THE INVENTION

The present invention relates to attachments for the draft links of a tractor and for the tongue of a two-wheeled vehicle. Specifically, the present invention relates to such attachments which cooperate to permit the tongue of the vehicle to be raised from the ground to a position for connection to the tractor drawbar.

Two-wheeled vehicles, such as trailers and implements are commonly found on farms. Many of these vehicles are of a type having tongues or hitch structures rigid with their bodies or frames. Many vehicles of this type are balanced relative to the respective axes of their wheels such that when their tongues are unhitched from the drawbar of tractors used to tow the vehicles, the vehicles tilt about their respective wheel axes until the tongue rests on the ground. Therefore, in order to again hitch the vehicle to the tractor drawbar, it is necessary to lift the unbalanced weight of the vehicle to again dispose the hitch at the necessary height for connection to the tractor drawbar. Such lifting may require much manual effort and may require more than one person to accomplish the hitching of the vehicle.

Solutions to the above-described problem have been to either provide the tongue of the vehicle with a jack for keeping the tongue from falling after its disconnection from the tractor drawbar or to provide the tractor with a power-operated drawbar, which is vertically swingable for picking up a tongue from the ground.

The first-mentioned past solution has the disadvantage in that it requires a jack to be supplied with vehicles which are not in use. This adds to the cost of the vehicle. Also, the operator must dismount from the tractor to operate the jack. The second-mentioned past solution requires a specially designed drawbar to be supplied with a tractor even though the tractor will generally be used for purposes other than towing a two-wheeled vehicle. Thus, here also the convenience of easy attachment cannot be had without a considerable cost.

SUMMARY OF THE INVENTION

According to the present invention, there is provided attachments whereby a towed vehicle tongue or hitch structure may be lifted from the ground to a position for attachment with a tractor drawbar by actuation of the tractor hydraulics for raising and lowering the tractor draft links.

Specifically, the attachments include a pickup bar adapted for extending between and having its opposite ends pivotally connected to the rear ends of the tractor draft links and a spring abutment adapted to be connected to and having an end portion spaced above the forward end of the hitch structure of the towed vehicle.

An object of the invention is to provide such attachments which are relatively inexpensive and which may be easily attached to different tractors and different towed vehicles as desired.

A further object is to provide such attachments which make it possible for a tractor operator to hitch and unhitch a towed vehicle without the expenditure of undue effort and without leaving the tractor seat.

These and other objects will be apparent from the ensuing description and appended drawings.

BRIEF DESCRIPTION OF THE DRAWINGS

FIG. 1 is a schematic perspective view respectively showing the front and rear end portions of a two-wheeled vehicle and a tractor with the attachments of the invention connected thereto and with the tractor draft links shown in their lowered, pickup position.

FIG. 2 is similar to FIG. 1 but showing only the tongue of the vehicle and showing the tractor draft links raised to a height positioning the tongue level with the tractor drawbar.

FIG. 3 is similar to FIG. 2, but showing the tongue and drawbar positioned for interconnection.

FIG. 4 is an enlarged side view of the coil spring abutment connected to the vehicle tongue.

FIG. 5 is a top view of the spring abutment shown in FIG. 4.

FIG. 6 is a perspective view of a second embodiment showing a leaf spring abutment connected to the implement tongue.

DESCRIPTION OF THE PREFERRED
EMBODIMENT

Referring now to the drawings, there is shown in FIG. 1, the front end of a two-wheeled vehicle, indicated in its entirety by the reference numeral 10, and the rear end of a tractor, indicated in its entirety by the reference numeral 12.

The vehicle 10 may be a trailer or a farm implement, or the like, and includes a rigid body or frame 14 supported on a pair of ground wheels 16 and 18 mounted for rotation about a common transverse axis preferably located rearwardly of the transverse vertical plane in which the center of gravity of the vehicle is located. Integral with and extending forwardly from the frame 14 is a tongue or hitch structure 20 having a clevis 22 at its forward end. Spaced rearwardly from the clevis 22 (FIGS. 1–5) is a right angular support bracket 24 having a first leg clamped at one end to and projecting upwardly from the top of the tongue 20 and having a second leg spaced from and extending forwardly above the tongue 20. Approximately at the juncture of the legs of the bracket 24 is fixed a short transverse tube 25 on which the coiled portion a coil spring abutment 26 is received, one end of the coiled portion terminating in a forwardly extending tine 27 overlying and projecting forwardly of the forwardly extending leg of the bracket 24. Depending downwardly from the forwardly extending leg of the bracket 24 is a stop 28, the purpose of which is explained below.

In the embodiment illustrated in FIG. 6, a leaf spring abutment 30 is clamped to the upper side of the tongue 20 rearwardly of the clevis 22 and is angled upwardly to a forward end portion 32 which generally parallels and is spaced above the tongue 20.

The tractor 12 is a common agricultural type having a pair of rearwardly extending draft links 34 and 36 pivoted, at their forward ends, to the tractor body for vertical swinging movement. The draft links 34 and 36 are raised and lowered by the tractor hydraulics in the usual way through means including a pair of lift links 38 and 40. A pair of ball couplers or sockets 42 and 44 are respectively mounted adjacent the distal ends of the draft links 34 and 36. A generally V-shaped lift or pickup bar 46 has its opposite ends respectively received in the ball couplers 42 and 44. The bar 46 is shaped such that when the lift arms are in a lowered position, as shown in FIG. 1, at least the central portion of the bar 46 is disposed low enough to be liftingly engaged with the undersides of the forward portions 27 and 32, respectively, of the coil spring abutment 26 and the leaf spring abutment 30.

The tractor 12 also includes a drawbar 48 to which the tongue or hitch structure 20 of the vehicle 10 may be connected.

The operation of the tongue or hitch structure lift attachment is as follows. Assuming that the tongue 20 of a two-wheeled vehicle 10 to be towed is resting on the ground, the tractor 12 is backed closely to the forward end of the tongue 20. The draft links 34 and 36 are then lowered, in the usual way, until the central portion of the lift bar 46 is located at a level below the height of the tine 27 of the abutment 26 (FIGS. 1–5) or below the level of the portion 32 of the abutment 30 (FIG. 6). The tractor 12 is then backed until the bar 46 is disposed directly beneath the forward end of the tine 27 (FIG. 1) or the leaf spring portion 32, it being noted that the stop 28 on the bracket 24 and the upwardly angled portion of the leaf spring abutment 30 insure that the bar 46 engages only the forwardmost portions of the spring abutment 26 or 30. The tractor hydraulics are then actuated to lift the draft links 34 and 36 in the usual manner and the lift bar 46 acts through either the coil spring abutment 26 or the leaf spring abutment 30 to lift the tongue 20 to a height level with the tractor drawbar 48. The tractor 12 is then backed until the holes in the clevis 22 are aligned with a hole in the drawbar 48. During such backing of the tractor 12, it should be noted that the lift bar 46 will rock forwardly about the axis of the connection of its ends with the ball couplers 42 and 44. When the holes in the clevis 22 are in vertical alignment with a hole in the drawbar 48, a coupling pin (not shown) is inserted in the holes. The draft links 34 and 36 are then hydraulically lifted out of the way to a fully raised position. As the lift bar 46 raises, it deflects either the coil spring abutment 26 or the leaf spring abutment 30 and eventually clears the same.

What is claimed is:

1. In combination with a tractor having a pair of lift links and a drawbar and with a two-wheeled vehicle having a forwardly extending hitch structure, hitch structure lift attachments comprising: a spring forming an abutment and being connected to and extending forwardly above said hitch structure adjacent the forward end of the latter, said abutment having at least a forward end portion spaced from said hitch structure; and a lift member extending between and being connected to said lift links and including a central portion disposed at a height lower than said abutment end portion when said lift links are in a lowered position and the forward end of said hitch structure is resting on the ground.

2. The invention defined in claim 1 wherein said abutment is a coil spring.

3. The invention defined in claim 1 wherein said abutment is a leaf spring.

4. The invention defined in claim 1 wherein said lift links include ball sockets adjacent their rear ends and said lift member being a bar having its opposite ends received in said ball sockets.

5. The invention defined in claim 4 wherein said bar is generally V-shaped.

6. In combination with a tractor having a pair of lift links and a drawbar and with a two-wheeled vehicle having a forwardly extending hitch structure, hitch structure lift attachments comprising: an abutment connected to and extending forwardly above said hitch structure adjacent the forward end of the latter, said abutment having at least a forward end portion spaced from said hitch structure; and a V-shaped bar forming a lift member extending between and having its opposite ends pivotally connected to said lift links and including a central portion disposed at a height lower than said abutment end portion when said lift links are in a lowered position and the forward end of said hitch structure is resting on the ground.

References Cited
UNITED STATES PATENTS

| | | | |
|---|---|---|---|
| 2,514,614 | 7/1950 | Von Schlegell | 280—479 A X |
| 2,741,967 | 4/1956 | Oehler | 172—272 |
| 3,226,818 | 1/1966 | Abbott | 280—461 A X |
| 3,524,660 | 8/1970 | Kew | 280—479 R X |

FOREIGN PATENTS

| | | | |
|---|---|---|---|
| 418,149 | 2/1967 | Switzerland | 280—479 R |
| 1,106,571 | 3/1968 | Great Britain | 280—479 A |

LEO FRIAGLIA, Primary Examiner

U.S. Cl. X.R.

172—272